US011239006B1

(12) United States Patent
Mankevich et al.

(10) Patent No.: US 11,239,006 B1
(45) Date of Patent: Feb. 1, 2022

(54) METHOD OF FABRICATING SECOND-GENERATION HIGH-TEMPERATURE SUPERCONDUCTING WIRES

(71) Applicant: CJSC "SuperOx", Moscow (RU)

(72) Inventors: Alexey S. Mankevich, Lesnoy gorodok Moskovskaya Obl. (RU); Alexandre A. Molodyk, Moscow (RU)

(73) Assignee: CJSC "SUPEROX", Moscow (RU)

( * ) Notice: Subject to any disclaimer, the term of this patent is extended or adjusted under 35 U.S.C. 154(b) by 0 days.

(21) Appl. No.: 17/224,101

(22) Filed: Apr. 6, 2021

(30) Foreign Application Priority Data

Sep. 25, 2020 (RU) .......................... RU2020131628

(51) Int. Cl.
*H01B 12/06* (2006.01)
(52) U.S. Cl.
CPC .................................... *H01B 12/06* (2013.01)
(58) Field of Classification Search
CPC ....................................................... H01B 12/06
See application file for complete search history.

(56) References Cited

U.S. PATENT DOCUMENTS

| | | | | |
|---|---|---|---|---|
| 4,385,880 A * | 5/1983 | Lemelson | ................... | B01J 3/08 |
| | | | | 425/150 |
| 5,424,254 A * | 6/1995 | Damiot | .................... | G01R 1/04 |
| | | | | 438/106 |
| 7,071,148 B1 * | 7/2006 | Selvamanickam | ..... | H01L 39/02 |
| | | | | 174/125.1 |

| | | | | |
|---|---|---|---|---|
| 2009/0298696 A1 * | 12/2009 | Otto | ........................ | H01L 39/02 |
| | | | | 505/230 |

(Continued)

FOREIGN PATENT DOCUMENTS

| | | |
|---|---|---|
| EA | 31113 B1 | 11/2018 |
| JP | 2012064495 A | 3/2012 |
| JP | 2013012406 A | 1/2013 |

(Continued)

OTHER PUBLICATIONS

Sotnikov, D. V., A Study of Current Carrying Properties of Potential High-temperature Superconducting Materials for Electrotechnical Devices, Extended Abstract of Cand. Sci. (Eng.) Dissertation, pp. 15-16, 2016, Moscow.

*Primary Examiner* — Paul A Wartalowicz
(74) *Attorney, Agent, or Firm* — Patentbar International, P.C.

(57) ABSTRACT

A method of fabricating second-generation high-temperature superconducting wires of a predetermined width involves the following stages: (A) fabrication of an HTS intermediate product for the production of HTS wires by sequential deposition of buffer layers, an HTS layer and a protective layer on the substrate tape; (B) slitting of the intermediate product of stage (A) in the longitudinal direction into HTS wires of a predetermined width. Each wire comprises at least one edge formed during slitting, with delaminated fragments adjoining said edge; (C) removing the delaminated fragments of the HTS wire obtained at stage (B); (D) applying an additional protective layer onto the wire of stage (C). The method makes it possible to retain the current carrying properties of an HTS wire after mechanical treatment, such as slitting, and to ensure predictability and stability of such properties.

9 Claims, 3 Drawing Sheets

(56) References Cited

U.S. PATENT DOCUMENTS

2014/0155269 A1* 6/2014 Daibo ................... H01L 39/143
                                                    505/211
2016/0027556 A1* 1/2016 Okuno ................... H01L 39/24
                                                    505/237

FOREIGN PATENT DOCUMENTS

JP          5727278 B2    6/2015
RU          2662801 C1    7/2018
RU          2707564 C1   11/2019

* cited by examiner

METHOD OF FABRICATING SECOND-GENERATION HIGH-TEMPERATURE SUPERCONDUCTING WIRES

RELATED APPLICATIONS

This application claims priority to Russian Patent Application RU2020131628, filed Sep. 25, 2020, which is incorporated herein by reference in its entirety.

FIELD OF THE INVENTION

The present invention relates to the field of the production of second-generation high-temperature superconducting (HTS) low-width (typically from 1 to 11 mm) wires based on rare earth-barium-copper complex oxides, which can be used in devices that require constant wire quality assurance, in particular in fault current limiters, generators, motors, transformers, magnets, etc., and to a method of such superconductor quality assurance.

BACKGROUND OF THE INVENTION

With the growing availability of HTS wires, more and more novel cables, equipment and high-field magnets are integrated into the power industry, while improved cryogenic technologies make it possible to develop prototypes for a new generation of devices for electric propulsion, wind generation, magnetic suspension systems and energy storage.

The production technology of second-generation high-temperature superconducting wires (hereinafter "2G HTS wires" or "HTS wires") is a complex process based on the achievements in chemistry, physics, metallurgy and other fields. The main advantage of 2G HTS wires is their high current carrying capacity in high magnetic fields at liquid nitrogen temperatures.

Second-generation HTS wires are a multilayer structure generally created in the same order: the substrate tape (usually made from nickel-based alloys or stainless steels); buffer layers comprising aluminum oxide ($Al2O3$), a layer used to prevent the interaction of the HTS layer and the substrate tape (hereinafter "the substrate"), yttrium oxide ($Y_2O_3$), magnesium oxide (MgO) and lanthanum manganite ($LaMnO_3$); a high-temperature superconducting layer applied onto the buffer layers; a silver-, copper-etc. based protective layer protecting the HTS wire from interaction with water vapors and carbon dioxide, and also protecting HTS wires from mechanical damage and direct contact with shunt materials (copper, stainless steel).

The prior art process of fabricating second-generation high-temperature superconducting wires of low width (typically from 1 to 11 mm) includes the stage of slitting wide HTS wires into narrow ones. For example, a 12-millimeter-wide HTS wire is slit into three 4-mm ones.

The slitting is typically performed by a mechanical method by passing the wire between disc knives, or by laser slitting (see "A Study of Current Carrying Properties of Potential High-temperature Superconducting Materials for Electric Power Devices", (D. V. Sotnikov, extended abstract of Cand. Sci. (Eng.) Dissertation, p.p. 15-16, Moscow 2016). In both cases the slit edge is a place of concentration of stresses and deformations, which can compromise the architecture of the HTS wire and, as a result, lead to deterioration of the current carrying properties.

That having been said, the most affordable and productive method is mechanical slitting with disc knives. To conduct the method, it is required that the knives be precisely positioned. In mechanical slitting, an area of plastic deformations is formed at the slit edge. The bending of the substrate in this area promotes the peeling-off of the protective layer, e.g. silver, from the HTS layer. Often, such delamination damage of layers propagates up to 1 mm from the slit edge. However, there are no visual signs of delamination, just as is the case with laser slitting. But the existence of such delamination makes the wire unfit for any further use.

HTS wire developers and producers address the above-mentioned problem in different ways. Basically, the efforts are aimed at creating an additional protection of the wire edges from the delamination of layers, thereby increasing their delamination strength, in order to ensure a consistently high current density in HTS wires.

Thus, for example, to obtain a consistently high currency density in narrow HTS wires, a method of longitudinal slitting with rotating disc knives is used, which makes it possible to obtain very narrow wires (JP2013012406, 17.01.2013).

A downside of the above method is the fact that the defects caused by slitting are intentionally located in the narrow scrap wire section, which results in a guaranteed loss of 20 percent of the source wire. The narrower the required wire and the source wire, the higher will be the proportion of scrap wire.

The closest technical solution to the present disclosure is the method according to patent JP5727278 (03.06.2015).

The above-mentioned patent discloses a method of obtaining a thin-film superconductor, wherein an intermediate layer, an oxide-based superconducting layer and a first protective layer of silver are formed on a wide metal substrate, resulting in obtaining an intermediate product for further use in the production of HTS wires. The intermediate product is subjected to thermal treatment in the atmosphere of oxygen to oxygenate the superconducting layer, and then the intermediate product is slit longitudinally into tapes of a predetermined width.

Thereafter, a second protective layer of silver is formed on the slit tapes by vapor phase deposition, and a copper stabilizing layer is deposited by electroplating/sputtering. The second silver protective layer is deposited by using a thin film deposition technique. The inventors believe that in that case, stresses do not occur in the superconducting layer or the intermediate layer. The patent specification explains that the second silver protective layer can cover both the slit edge and the other edge.

But even if the edges of the wire are covered with a layer of silver after slitting, as it is done according to said patent, the loss of quality due to layer delamination would persist, as silver deposition processes cannot completely seal off such delamination areas, and the HTS wire would be damaged during the copper plating stage. This method can only insignificantly reduce the number of defects caused by layer delamination during slitting. Given the presence of separated fragments, any additional protection, e.g. depositing a second silver layer and subsequent copper plating, would not be effective, since delamination would additionally occur at those stages and also because of thermal cycling during the wire operation. In all cases such delamination results in deterioration of the current carrying properties of the HTS wire and assemblies based on such wire (in this case "assemblies" mean various ways of HTS wire lamination, e.g. obtained by means of soldering brass or stainless steel tapes to HTS wires, making stacks of HTS wires, etc.).

Another downside of the above method is the poor predictability and low stability of the current carrying properties of HTS wires.

All the shortfalls mentioned above present technical problems in the practical execution of the prior art method.

SUMMARY OF THE INVENTION

The objective of the present invention is to eliminate said technical problems, namely to retain the current carrying properties of an HTS wire after mechanical treatment, i.e. slitting, as well as to ensure the predictability and stability of said properties.

The set objective is achieved by a method of fabricating second-generation high-temperature superconducting wires of a predetermined width comprising the following stages:

(A) the fabrication of a high-temperature superconducting intermediate product for the production of high-temperature superconducting wires by sequential deposition of buffer layers, a high-temperature superconducting layer and a protective layer on the substrate tape;

(B) the slitting of said intermediate product of stage (A) in the longitudinal direction into high-temperature superconducting wires of a predetermined width, wherein each wire comprises at least one edge formed during slitting, with delaminated fragments adjoining said edge;

(C) the removal of delaminated fragments of the wire obtained at stage (B);

(D) the application of an additional protective layer onto the wire of stage (C).

In specific invention embodiments, the set objective is achieved by a method wherein the removal of delaminated fragments at stage (C) is performed with a rotating metal brush.

In that case, it would be expedient to position the rotating brush perpendicular to the direction of the wire movement.

In other specific invention embodiments, the protective layer is deposited by the magnetron sputtering technique.

The protective layer in stages (A) and (D) can be made of silver and/or copper.

The obtained high-temperature superconducting wire can be additionally subjected to solder plating.

The obtained high-temperature superconducting wire can be additionally subjected to lamination.

Or, the obtained high-temperature superconducting wire can be additionally coated with a layer of electrical insulation material.

DETAILED DESCRIPTION OF THE PREFERRED EMBODIMENTS

The distinctive feature of the claimed method is the step consisting in the removal of delaminated fragments, performed in the claimed method after the slitting of the intermediate product into low-width wires and prior to the application of an additional protective layer.

It has been established that if delaminated fragments are not removed, the additional protective layer will not be functional, and delamination will occur at the subsequent stages of the production process of fabricating the HTS wire, as well as because of the HTS wire thermal cycling during its operation. In all cases, the presence of delaminated fragments resulted in deterioration of the current carrying properties of the wire.

In the method we claim, all delaminated sections are removed first, and additional layers of silver or a combination of silver and copper are deposited thereafter. As a result, the structure of the wire becomes resistant to the potential damage during further production stages and thermal cycling, and no deterioration of the current carrying properties occurs.

The term "delaminated fragments" as used herein means fragments of the wire architecture that have undergone delamination at slitting (fragments that have peeled off).

"Predictability" of current carrying properties as used herein means the ability to predict the level of current in the obtained low-width HTS wires prior to slitting, by dividing the current of the raw wire by the number of HTS wires to be obtained, since it is assumed that the level of HTS wire degradation under the claimed method is so low that it does not affect the critical current significantly.

"Stability" as used herein means the ability to repeat the result multiple times, the result being the absence of degradation at the slit edges. In other words, the dependence on the above-mentioned fine-tuning of the slitting process is no longer present.

The claimed method comprises the following stages.

Stage (A) includes fabricating an intermediate HTS product for the production of HTS wires. It is a standard procedure wherein functional layers are deposited on the substrate: first the buffer layers, then the HTS layer, protective layers and so on.

For the practical execution of the present invention, the order in which the layers are deposited, their composition, and their deposition techniques are not important.

At stage (B), the intermediate product of stage (A) is slit in the longitudinal direction into narrow HTS wires of a predetermined width. Each such wire comprises at least one edge formed as a result of slitting and coinciding with the slitting line. If wires are slit out of the central part of the intermediate product, there will be two such edges resulting from slitting. As a result of each slitting operation of the intermediate product delaminated fragments will form at the slit edge along the slitting line.

Figure 1:
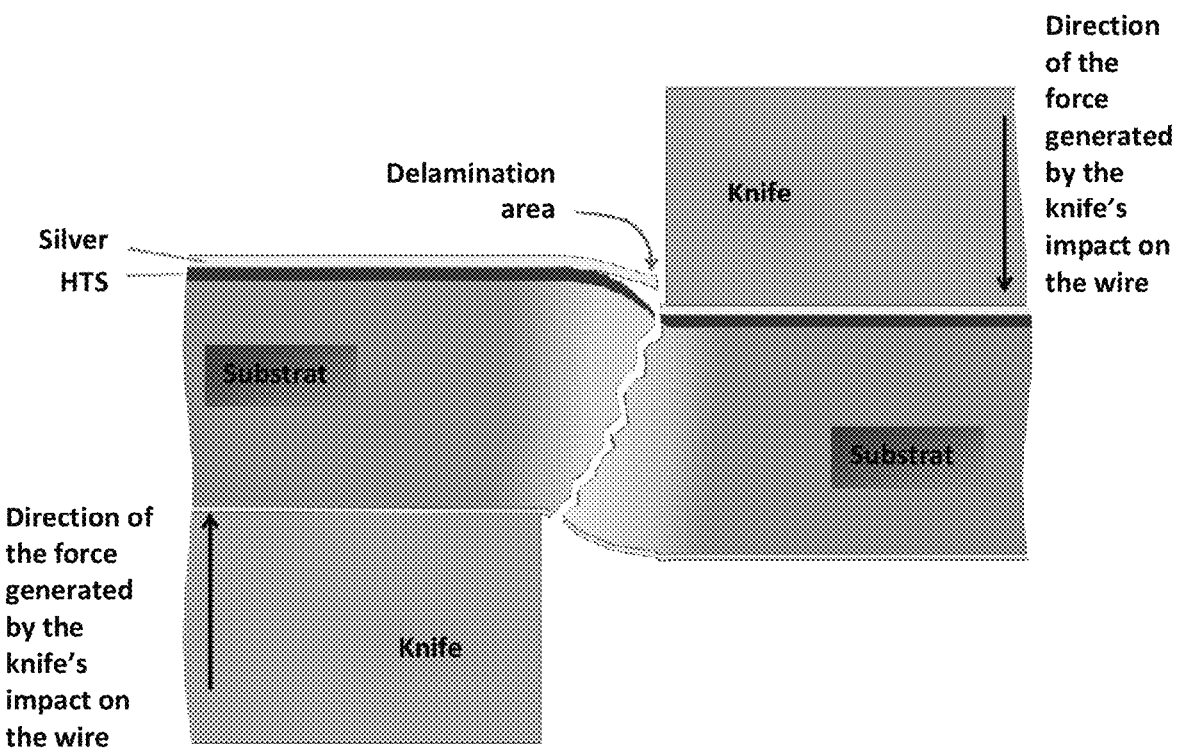
FIG. 1 shows a schematic diagram illustrating the formation of delaminated fragments during the mechanical slitting of HTS wires.

FIG. 1 shows a schematic view illustrating the formation of delaminated fragments during the mechanical slitting of HTS wires. As follows from the diagram, an area of plastic deformations is formed at the cut during mechanical slitting. The bending of the substrate in this area causes the protective layer (of silver and/or copper) to peel off from the HTS layer; all the other layers of the architecture are ceramic, hence they crack and replicate the bend of the substrate. On the other hand, the protective layer can bend and create a stress causing its delamination from the rest of the architecture. Often such delamination spreads as far as 1 mm across the wire width.

Stage (C) comprises the removal of delaminated fragments of the HTS wire obtained at stage (B). As already mentioned in the discussion of the closest analogue, research has shown that, if an additional protective layer is deposited onto the surface near the slit edge, that additional protection does not work, with delamination of the wire occurring as early as at the subsequent wire fabrication stages, as well as at thermal cycling thereof during operation.

Therefore, the inventors propose to remove the delaminated fragments prior to the deposition of a second protective layer.

Figure 2:
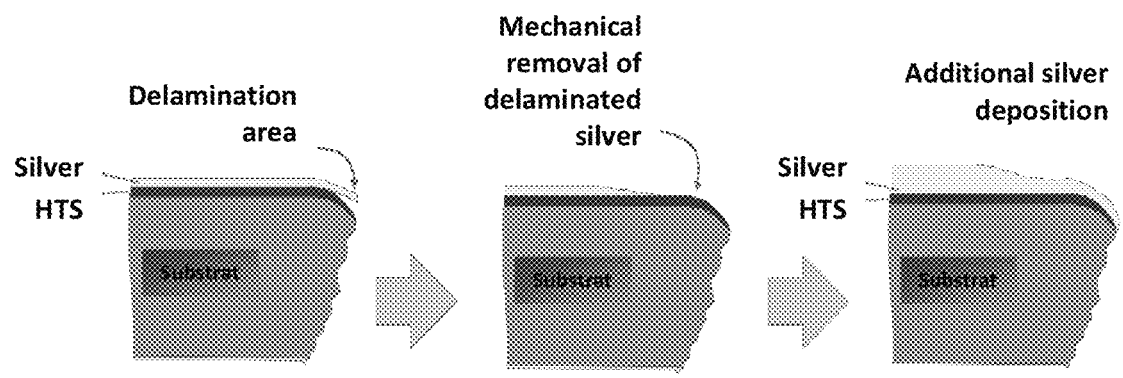
FIG. 2 shows a schematic diagram illustrating the regeneration of the delaminated fragments of HTS wires.

FIG. 2 shows a schematic view illustrating the restoration of a HTS wire in the event of delamination at the wire edge. As follows from the picture, delaminated fragments are removed from the slit edge, typically by a mechanical method.

Figure 3:
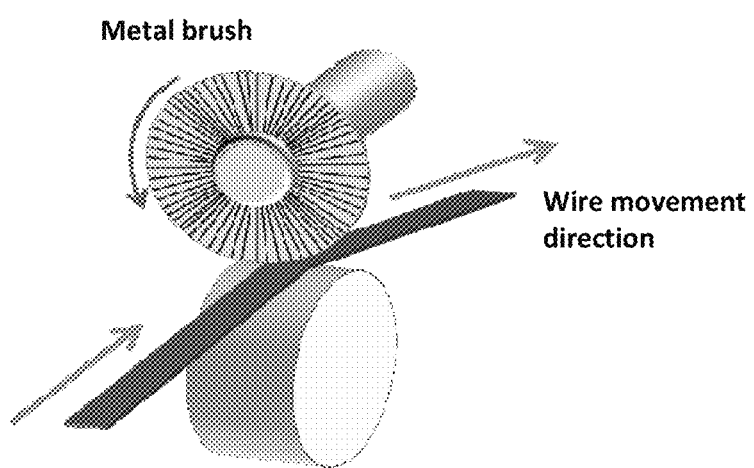
FIG. 3 shows a schematic diagram illustrating the process of the removal of delaminated fragments of HTS wires with the help of a mechanical rotating brush.

During experiments, the removal of delaminated fragments with the help of a soft metal brush proved effective (see FIG. 3).

For this purpose, after slitting the HTS wire is moved over a round support; above the support is positioned a rotating disc metal brush whose touching point is brought down onto the slit edge of the wire. The disc plane is positioned perpendicular to the wire. In the best embodiment of the present invention, the brush is rotating in the direction from the edge to the center of the wire so that the whole area subjected to delamination is processed. Such mode of the brush movement ensures the easiest possible removal of delaminated fragments.

The wire rests against the support side bar (not shown), to prevent the wire displacement. The width of the brush touch (mechanical treatment width) is selected such as to guarantee the maximum width of treatment of delaminated fragments.

The brush touches the wire with a very little force removing only those fragments of the architecture that underwent delamination during slitting, while leaving in place those sections of the architecture that are stable. The force can be controlled by the degree of pressure of the brush against the wire by means of moving it in the vertical direction.

Stage (D) comprises the deposition of an additional protective layer onto the wire of stage (C).

All the stages are conducted while moving the intermediate product or HTS wires by means of rollers.

The narrow HTS wire obtained as described above may be subjected to additional operations of copper plating, solder plating, lamination, applying an insulation material (if required), etc. with complete retention of its current carrying properties.

The claimed method can be carried out in practice, for example, as follows:

A Hastelloy C-276 metal tape was electrochemically polished and buffer aluminum oxide and yttrium oxide layers were deposited thereon by magnetron sputtering. Thereafter, the method of electron beam evaporation with ion beam assisted deposition was used to deposit a textured layer of MgO, which was made thicker with an additional layer of MgO deposited by electron beam evaporation; subsequently, lanthanum manganite was deposited by magnetron sputtering; a layer of $GdBa_2Cu_3O_7$ superconductor was deposited on said lanthanum manganite by pulsed laser deposition, and a finishing silver coating (protective layer) was deposited by magnetron sputtering. The wire was annealed in oxygen, e.g. at 250-650° C. The obtained 12 mm wide tape-shaped intermediate product was slit with disc knives in the longitudinal direction into three HTS wires, each 4 mm wide.

Thereafter, each of the slit edges was cleaned of delaminated fragments with a soft steel brush while drawing the wire over the support upon which the brush was working.

Thus obtained 4 mm wires were coated with an additional protective layer of silver by magnetron sputtering.

To conduct the testing, we took the three wires obtained by slitting the intermediate 12 mm product. Delaminated fragments were removed only on the central wire (as per the present invention), while they were kept intact on the outside wires (as per the prototype method).

Figure 4:
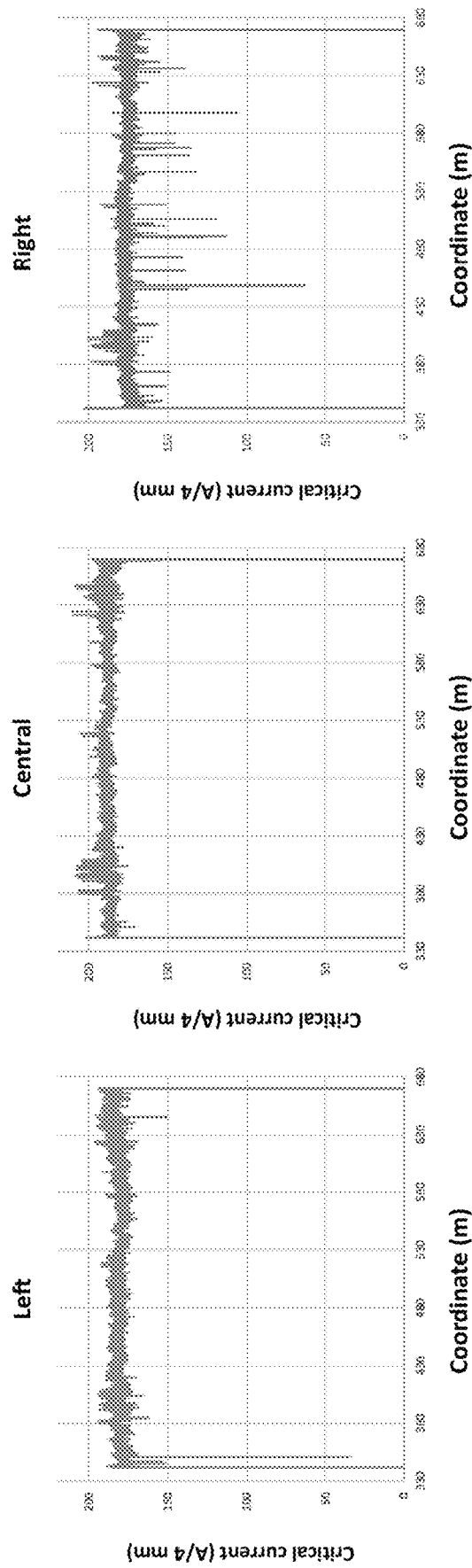
FIG. 4 shows the plots of critical current distribution in 4-mm HTS wires.

FIG. 4 shows the graphs of critical current distribution in all the three wires.

These data show that (unlike the outside wires) the central wire that had the most severe level of delamination during slitting and that was subjected to the cleaning of delaminated fragments with subsequent deposition of additional silver and copper layers had no critical current drop-outs caused by delamination at the slit edges. This confirms the possibility to retain the current carrying properties of a HTS wire after mechanical treatment and to predict the level of critical current of each narrow wire obtained by slitting the intermediate product.

What is claimed is:
1. A method of fabricating a second-generation high-temperature superconducting wire of a predetermined width, the method comprising:
   (A) fabricating a high-temperature superconducting intermediate product by sequentially depositing buffer layers, a high-temperature superconducting layer and a protective layer on a substrate tape;
   (B) slitting the intermediate product of stage (A) in a longitudinal direction to form the high-temperature superconducting wire of the predetermined width, the high-temperature superconducting wire comprising at least one longitudinal slit edge formed during the slitting step with delaminated fragments formed during the slitting step and adjoining the at least one longitudinal slit edge;
   (C) removing the delaminated fragments adjoining the at least one longitudinal slit edge of the high-temperature superconducting wire obtained at stage (B); and
   (D) applying an additional protective layer onto the high-temperature superconducting wire of stage (C).

2. The method according to claim 1, wherein removing the delaminated fragments adjoining the at least one longitudinal slit edge at stage (C) comprises using a soft rotating disc metal brush.

3. The method according to claim 2, further comprising positioning the rotating brush perpendicularly to a direction of wire movement.

4. The method according to claim 1, further comprising depositing the protective layer by magnetron sputtering.

5. The method according to claim 1, wherein the protective layer comprises silver and/or copper.

6. The method according to claim 1, further comprising performing oxygen annealing at stage (A) after applying the protective layer.

7. The method according to claim 1, further comprising solder plating of the high-temperature superconducting wire obtained at stage (D).

8. The method according to claim 1, further comprising laminating the high-temperature superconducting wire obtained at stage (D).

9. The method according to claim 1, further comprising coating the high-temperature superconducting wire obtained at stage (D) with a layer of an electrical insulation material.

* * * * *